INVENTOR.
GEORGE F. QUITTNER
BY Richard MacCutcheon
ATTY.

INVENTOR.
GEORGE F. QUITTNER
BY Richard MacCutcheon
ATTY.

INVENTOR.
GEORGE F. QUITTNER
BY Richard MacCutcheon
ATTY.

Sept. 13, 1966 G. F. QUITTNER 3,273,055

CONSTANT IMPEDANCE DUAL CIRCUITS FOR SAMPLE MATERIAL FLAW DETECTION

Original Filed April 16, 1962 4 Sheets-Sheet 4

INVENTOR.
GEORGE F. QUITTNER
BY Richard MacCutcheon
ATTY.

3,273,055
CONSTANT IMPEDANCE DUAL CIRCUITS FOR SAMPLE MATERIAL FLAW DETECTION

George F. Quittner, Cleveland Heights, Ohio, assignor, by mesne assignments, to API Instruments Company, Chesterland, Ohio, a corporation of Ohio Continuation of application Ser. No. 187,875, Apr. 16, 1962. This application Oct. 18, 1965, Ser. No. 502,766
5 Claims. (Cl. 324—37)

The present application is a continuation of my co-pending application Ser. No. 187,875, filed April 16, 1962, and now abanoned, which was, in turn, a continuation-in-part of my application Ser. No. 82,348, filed January 12, 1961, and now abandoned, all assigned to the assignee of the present invention or to its predecessor in interest, and all relating to magnetic flaw detection devices, and having significance in connection with circuits which include coil electrical pick-up means surrounding metallic material rods, wires, and the like, for inspection. In general the specimens are relatively uniform in cross section and of extended length.

There are a great many devices patented, and some in practical use, for detecting flaws and flawlike conditions in extended lengths of materials such as steel wires, welding rod, ACSR (aluminum around a core of steel reinforcement), electrical power transmission wires, etc. There are also many patents in the field of railroad track inspection which require non-surrounding sensing means. In the past the most useful of these devices use alternating current for search coil energization and the resulting wave forms are examined for characteristic flaw-caused alternations. In the past another group of devices utilized a D.C. magnetizing coil preceding (in the direction of sample motion) a search or sensing coil. This arrangement is simple, relatively inexpensive and useful under certain conditions. The present invention is an improvement on both D.C. and A.C. types of flaw detection devices which have heretofore been disadvantageous because having the tendency to show, as flaw signals, voltage changes resulting from (1) stray ambient alternating magnetic flux, (2) radial movements of the sample, and (3) remote occurrences telegraphed to the pick-up by the sample due to magnetic fields induced in the sample at a point remote from the pick-up, and other more or less remote occurrences.

It is an object of the present invention to provide simple means for overcoming the above mentioned difficulties.

Another object is to achieve the rejection of spurious signals by means easily and inexpensively manufactured.

Another object is to provide a connection and apparatus arrangement which permits convertibility and flexibility and adjustability all without affecting desired phase relations which result in opposition for cancelling unmanted signals either magnetically or capacitively induced.

A further object is to provide stable and reliable flaw detecting means for determining flawlike non-homogeneities in extended lengths of materials of essentially constant cross section with such means particularly suited for use in difficult environments.

In accordance with one aspect of the present invention I achieve these and other objects and provide many advantages by mounting along the sample two search coils connected differentially and also to a differential amplifying means, together with symmetrical magnetic field generating means whose lines of flux pass symmetrically through the search coils and return via the sample or around the coils.

The various objects and advantages will be apparent and this invention may be better understood from consideration of the following description taken in connection with the accompanying drawings, in which.

Figure 1:
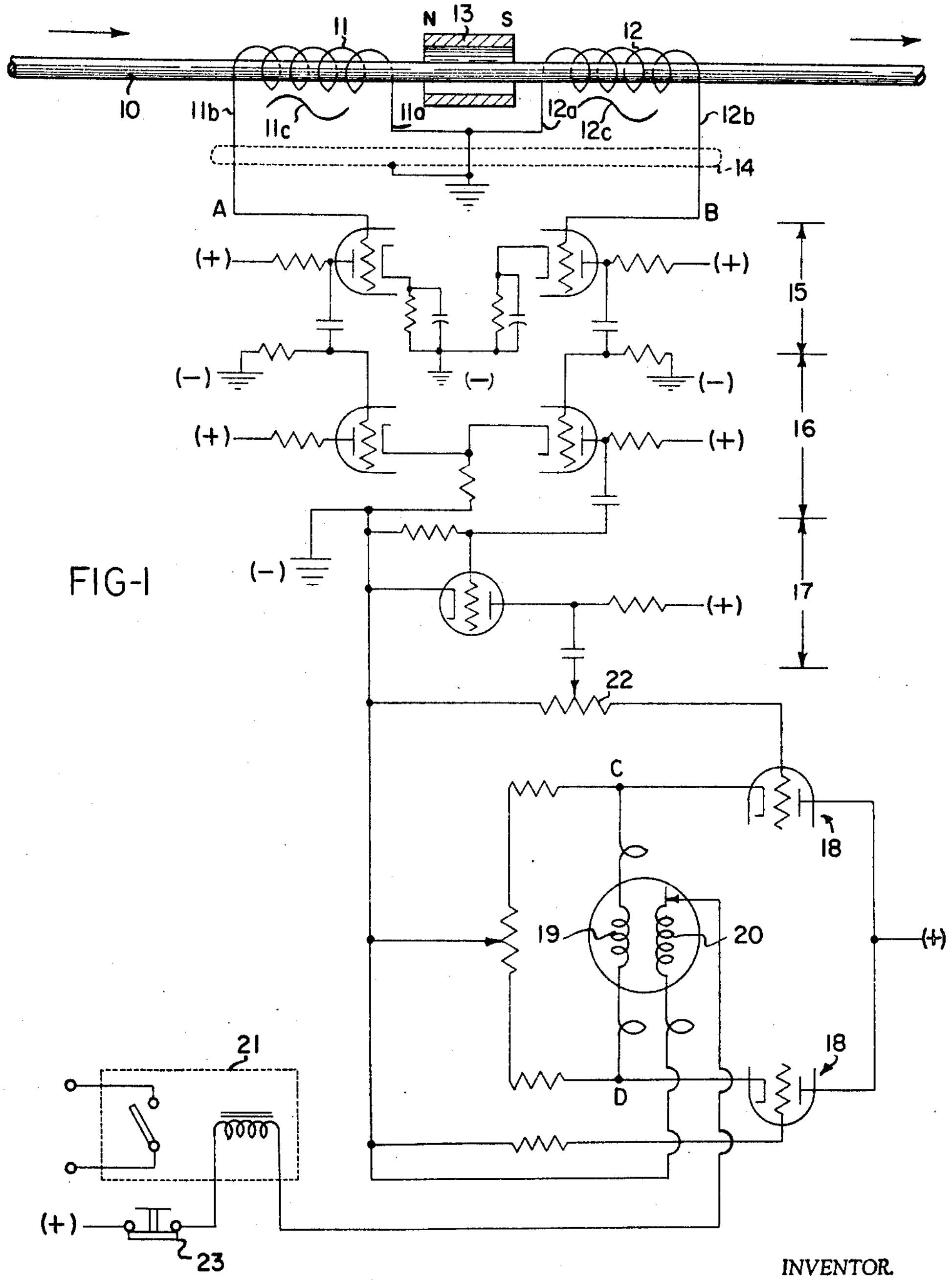
FIG. 1 is a schematic diagram of a preferred embodiment of the invention including a sensing transducer portion and an amplifying and signalling portion.

Referring now to FIG. 1, two pick-up or sensing coils 11 and 12 are arranged coaxial with a moving rod-like or tubular sample 10 which is at least partially of magnetic, or at least conductive material. Coils 11 and 12 are oppositely wound, or turned around, as illustrated, and otherwise preferably identical, each of many turns of fine wire. A hollow cylindrical permanent magnet 13 is mounted between the coils 11 and 12 on the same axis. The sample 10 to be tested passes first through one coil, then through the magnet, then through the second coil, all having a common axis. From the coils, center wires 11*a*, 12*a*, respectively, are connected to produce summed rather than differential output voltage between 11*b* and 12*b* with respect to common-connected leads 11*a*–12*a*. 11*a*, 12*a* are grounded as is a flexible shield 14 within which signal coil leads 11*b* and 12*b* are preferably enclosed so that minimum ambient pick-up will occur in the leads 11*b*–12*b* which conduct the picked-up flaw signals generated in the transducer portion to points A and B of an amplifying portion hereafter to be described.

In FIG. 1 the amplifying and signalling portions comprise a series of well known circuits, each familiar to those skilled in the electronic art. An input amplifier pair, designated generally at 15, provides amplification of signals. The signal next enters a double triode stage, generally designated as 16, which acts as a differential amplifier wherein common signal discrimination is provided and a single-ended output is produced for a vacuum tube 18—18 voltmeter circuit operating a contact meter 19, 20.

When, as hereinafter discussed, A.C. excitation is used, the differential amplifier 16 of FIG. 1 will be useable, if by suitable adjustment of input signal levels the difference amplifier tubes are somewhat overdriven, so that a change in one input level as compared with the other produces a rapid corresponding change in the average D.C. tube current drawn, with the desired pulses (at much lower frequency than excitation frequency) then passing through subsequent stages detectably. Other methods of difference detection for A.C. excitation are possible and may sometimes be preferred. The A.C. from input amplifiers may, for example, be rectified and smoothed, and changes in the resulting D.C. level passed onto further circuits, as discussed in connection with FIG. 6, hereinafter. Another arrangement for A.C. excited systems is to provide a one-shot multivibrator to sense peaks as short as one excitation half-cycle, and use the lengthened output pulse to operate the vacuum tube voltmeter 18 and the meter relay 19–20.

In FIG. 1, in an additional amplifier stage, designated generally as 17, the single-ended output is further amplified to a relatively high level.

Finally, the signal from 17 is read-out by a memory device, which could have been a thyratron operating a relay but which is shown, for the preferred embodiment, as a vacuum tube voltmeter incorporating a dual triode 18 (arranged as a vacuum tube voltmeter) and an assumed d'Arsonval glavanometer type meter relay having a sensitive coil 19 and a locking coil 20 and contacts serving to energize a load relay 21. In the circuit as shown a grid return resistor 22 has a variable tap provided in order to regulate the size of signal required to lock in the meter relay, and a normally closed push button switch 23 is used to permit manual resetting of load relay 21 and meter relay 19–20 after a flaw has been detected and indicated to the operator by the closing of the load relay and, for example, the sounding of a warning horn or bell (not shown).

The use of an indicating meter relay (see, for example, U.S. Patent 2,576,371, issued November 27, 1951) is particularly advantageous as it combines in one economical device a continuous reading of random noise with an alarming contact which the operator may conveniently set a reasonable amount above the noise level to assure discrimination between insignificant "noise" and the larger and sought-for flaw induced signals.

Figure 2:
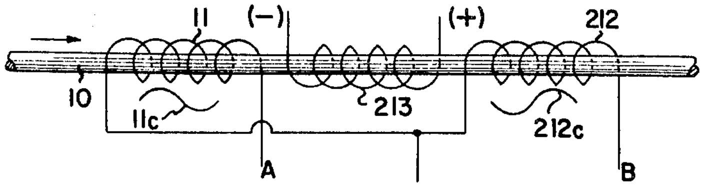
FIG. 2 shows a modified sensing transducer portion which may be used with the same amplifying and signalling portion as shown in FIG. 1.

Referring to FIG. 2, like numbers are used as before but a third coil 213 replaces the magnet 13 used in FIG. 1. In FIG. 2 coil 213 is a source of magnetic flux and the result could have been the same as for the arrangement of FIG. 1. But it should be noted that in FIG. 1 the coils 11 and 12 were oppositely wound (in space about the sample but on opposite sides of the flux source) so as to produce like fault signals (see curves 11*c*, 12*c* in FIG. 1), whereas in FIG. 2 the coils 11 and 212 are like wound from left to right so that, being on opposite sides of the flux source, they produce opposite fault signals (11*c*, 212*c* in FIG. 2). Therefore, while the like flaw signals generating coils of FIG. 1 were connected additively (to cancel simultaneous noise signals), the oppositely sensing coils of FIG. 2 are connected subtractively (again to cancel simultaneous noise signals) and then they have their interconnection grounded and feed the grounded amplifiers 15 (which are assumed as before) from the points A and B. In accordance with one aspect of the invention either such grounding, or a third connection in lieu thereof is essential, as hereafter explained.

Figure 3:
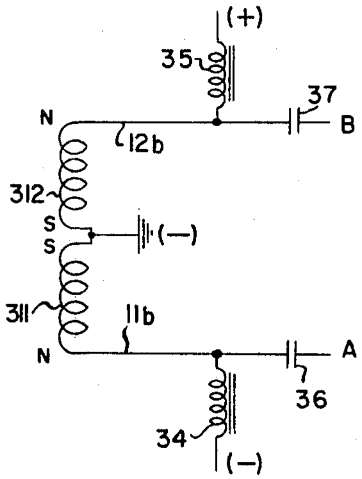
FIG. 3 shows another modification for the transducer portion.

FIG. 3 shows an arrangement which may be preferred for certain types of samples and sample speeds. Here the signal coils 311 and 312 themselves generate the magnetic flux, changes in which are caused by the passage of sample flaws through the coils. In FIG. 3 high inductance chokes 34 and 35 maintain the signal leads 11*b* and 12*b* at high impedance from ground for receiving changing signals such as those caused by flaws, while providing conductive paths for the direct current used to energize the sensing coils, while capacitors 36 and 37 and ground serve to conduct the flaw signals to the amplifiers but prevent the direct current sample magnetizing supply from flowing into the amplifier input circuits.

Figure 4:
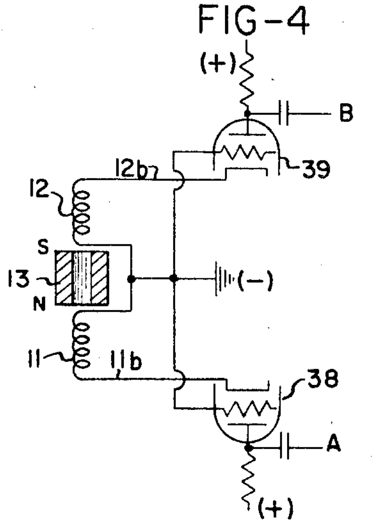
FIG. 4 shows yet another modification, and in this case there is a preamplifying arrangement interposed between the transducer and the amplifier portion which is assumed as shown in FIG. 1.

The transducer arrangement shown in FIG. 4 may be preferred for sensing flaws at unusually high speeds, where the distributed capacitance and self-inductance of many-turned high impedance pick-up coils would tend to reduce the amplitude of flaw signals having very steep rise and fall rates. With the arrangement of FIG. 4, the general configuration of grounded grid, cathode input amplifiers (tube sections 38 and 39) can raise the signal level suitably from transducers having sensing coils with relatively fewer turns.

Figure 5:
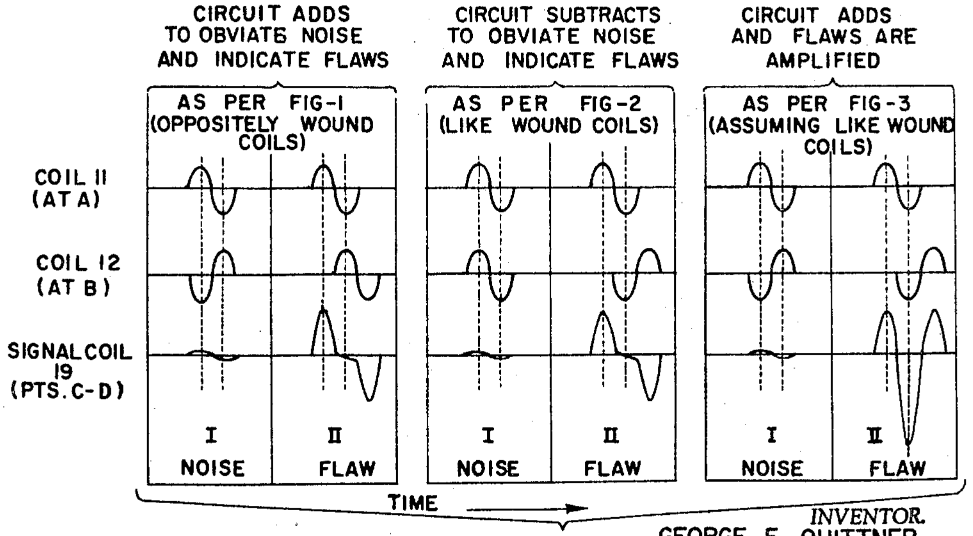
FIG. 5 is a graph of voltage against time and shows the signals produced by random noise pulse as contrasted with passage of a small flaw through any of the various transducers.

In FIG. 5 is shown a graph of voltages at A, at B and at the meter signal terminals (C, D), when (I) noise, or (II) a sample defect affects the transducer which in this example is excited by a D.C. or permanent magnet field.

What happens at either coil 1 or coil 2 is the same as what happens in well known single pick-up coil arrangements where signals cause signalling of the presence of a flaw.

With each of the arrangements of FIGS. 1, 2 and 4 (and even with FIG. 3 as hereinafter explained), when a flaw, such as a magnetic, or (because of eddy currents or capacity effect) even a conductive, non-homogeneity, or the mere front of a magnetically or electrically different section of the sample which is continuously fed through the transducer, nears and enters the first sensing coil it disturbs the flux path through coil and sample and generates a signal between the lead from that coil to the amplifier and ground. As this portion leaves the first coil, the negative of that signal appears at the amplifier in the same way. As the same flaw (or whatever) approaches the second coil, a signal (of the same amplitude as that generated when the flaw left the previous coil) is produced in the leads of the second coil. This is repeated, with reversed polarity, as the flaw leaves the second coil. Each flaw generates non-simultaneous signals in the pick-up.

The distinctive contribution of the present invention can be seen by considering the behavior of the sensing coils when subjected to (1) stray magnetic fields, (2) radial sample movements, and (3) magnetic (or electro-potential) fields induced in the sample by non-related occurrences.

Each of these types of interference (which in conventional transducers produce signals as able to actuate the signalling circuit as flaw signals) with an arrangement according to the invention affects both sensing coils equally, and simultaneously. As a result, such spurious signals are discriminated against by the connection of the coils and the normal action of the amplifiers. Signals which affect the coils simultaneously are disregarded, while those which sequentially affect the coils are amplified and recognized, the motion of the sample between coils being used to separate the desired signals in time.

As previously intimated, the center wire is essential and grounding it is preferred because this places the two sensing coils equidistant from ground electrostatically (as well as inductively) without requiring one to feed through the inductive reactance of the other. This is a departure from all prior art known to me, and while alternatives within the scope of the invention may be feasible (e.g., four wires carried through from sensing coils to difference detector) in accordance with all the illustrated embodiments of the present invention the two sensing coils always have one direct interconnection between them and three leads are taken out, one from the interconnection, and the other two providing respective signals with regard to the lead from the interconnection. The polarity of the connections with respect to the winding directions are selected so that the two signals obtained from the three leads are inphase and equal not only for constant magnetic field disturbances but also for capactively picked up voltages due to irrelevant ambient conditions. Therefore, when these equal and inphase signals are led to the double-ended difference detecting amplifier the output signal will have removed from it all of the previously mentioned unwanted signals. A further advantage, for example over subtracting in the coils, alone, as would be the case with a two wire (or many prior art three wire) output from a double coil sensing system, is that any resistive, or possibly other, means used to finely adjust amplitude can do so without affecting desired phase relations, and thus it is much easier to balance the effect of one sensing coil with that of the other, e.g., to compensate for unwanted "noise" being closer to one element than to the other.

As seen in FIG. 5, flaw signals (if they could be simultaneous) would be added with the same circuitry which substracts noise signals because (as seen in FIGS. 1, 2 or 4) the pick-up coils are adjacent oppositely magnetized poles. But this may not be necessary, because in any event the sample flaw caused signals occur in the two coils at different times and can still be recognized, amplified and signalled (while noise is cancelled) even with an arrangement as in FIG. 3 where the coils are not on opposite sides of a flux source but are themselves individual (but opposite) flux sources.

It is evident that the amplifying and signalling requirements may be met in any ways other than as illustrated, for example with thyratrons, Schmidt and other regenerative trigger circuits, or solid state avalanche type devices.

A sample, such as an elongated strip of sheet material need not be cylindrical to be tested. It could still be surrounded by and coaxial with pick-up and excitation means, which is the preferred arrangement according to this continuation application with the advantage that effects can be substantially equal in all directions in any plane transverse to the axis.

Figure 6:
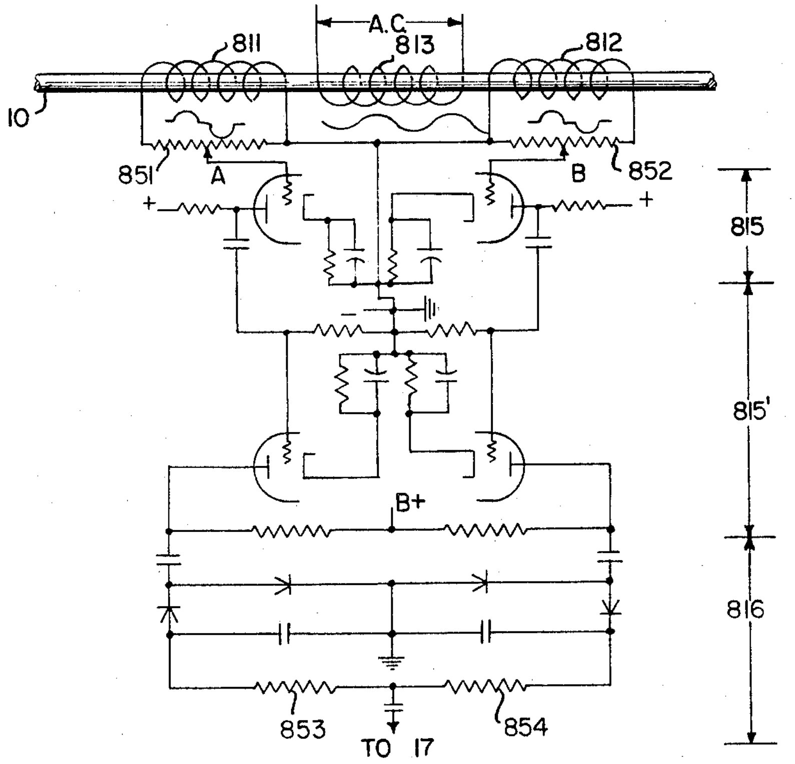
FIGS. 6–9 show modifications.

The excitation may be A.C. as indicated in FIG. 6, which is somewhat the same as FIG. 2. The geometry (and sample speed constancy) necessary to make A.C. excitation initiated half cycles from opposite pick-up coils cancel out in the differential amplifier (except when a flaw influences one or both of them) determines preferred winding direction as compared with circuit addition or subtraction as previously discussed.

The graphs of FIG. 5 suggests, although they do not specifically illustrate, the approximate situation when A.C. excitation is used, it being understood that in that case the graphed pulses represent detected and filtered changes in level of A.C. output from the input coils. The graphs, in such case, are inexact in that such rectified currents either increase or decrease and vice versa when a flaw enters and leaves a coil, and do not produce a full wave cycle as illustrated for the D.C. excitation case. When such rectified signals are differentiated, as they normally would be in passing through A.C. rectification (and post-rectification) amplifiers as discussed below, they may however, closely resemble the final (C–D) waves of FIG. 5.

Thus, referring to FIG. 6, pick-up coils 811 and 812 feed constant resistive loads comprising voltage dividers 851 and 852 from which high impedance signal processing elements (815) may be fed from the voltages selected by the tap positions. In FIG. 6 there is shown a second stage of dual signal amplification at 815′ and the difference detection means 816 takes the form of two half-wave voltage doublers of opposite polarity and sharing a common ground connection. One voltage doubler produces positive polarity D.C. with respect to ground, the other produces negative polarity similarly. Load resistor halves 853, 854 provide a tap at the point where D.C. potential is zero when equal A.C. signals are fed to the amplifiers. This type detector is phase-insensitive (with or without adjustment) and is often useful with A.C. excitation. The coupling capacitor shown at the bottom of FIG. 6 with the caption "to 17" acts with the grid resistor of section 17 in FIG. 1 as a differentiator, as discussed above. There is still basically the same invention but when A.C. excitation is used it may be desirable to provide rectifying means which might either be before the difference detecting, or might be after, or as a part of the difference detection.

Figure 7:
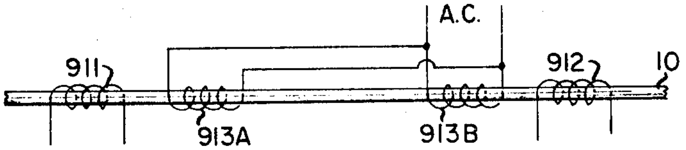
Figure 8:
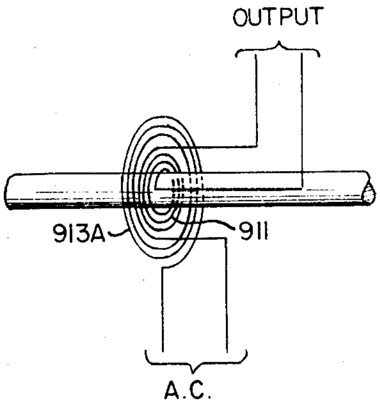

In the arrangement shown in FIG. 7, two exciting coils 913A, 913B are connected in parallel and thus the pick-up coils 911, 912 may be spread far apart as may be especially desirable for eddy current work. The coils are preferably coaxial with the sample axis and wound therealong. Alternatively, the pick-up and/or excitation coils may be pancake type coils (for compressing into minimum length) arranged about the sample as shown in FIG. 8 (showing only one-half or two-thirds of the coils required according to the invention).

It will be apparent that defects found by D.C. excitation pick-ups differ somewhat from those found by A.C. excitation pick-ups. The eddy current changes and other qualities affecting A.C. excitation field absorption reflect a great many types of flaws in both magnetic and electrically conductive but non-magnetic materials. The D.C. excitation voltage induction technique detects fewer kinds of discontinuities, principally those affecting sample permeability, coercivity and other "static" magnetic properties and is primarily useful in the inspection of magnetic materials and for the finding of magnetic inclusions (flaws, in this case) in non-magnetic materials. As a result, the ability of the invention to discriminate against noise and sample position changes when combined with the advantage of being useable with both A.C. and D.C. excitation, provides hitherto unavailable advantages in generality and flexibility of application and hence usefulness.

The signal pick-up elements need not even be coils. They may, instead, be capacitive electrodes (the "in-between" third lead being vie grounded sample) as in my co-pending patent application S.N. 122,748, filed July 10, 1961, and the disclosure of which is herein incorporated by reference. Or the pick-up elements might be, instead, radiant energy transducers used with reflecting and/or emissive samples, or the pick-up means may be temperature sensors, or static magnetic flux detectors (such as saturable reactors, or Hall effect detectors).

In accordance with one aspect of the invention it is not contemplated that difference is found from a mere two wire output of subtractively connected dual pick-ups. Three leads are taken out and thereafter there is a differential amplifier (as shown) or rectifiers preceded by high input impedance amplifiers.

In any event, it is necessary that the two sensing elements be spaced away in time (as regards relative association with respect to a flaw) each from the other, whether the sample (and thus the flaw) is moving, or whether the elements are caused to travel with respect to a stationary sample. Thus the flaws are amplified while signals from remote occurrences are cancelled. A "remote occurrence" as used herein may be regarded as "a source which causes flux lines to rise and fall within and/or about the sample simultaneously in both coils."

Figure 9:
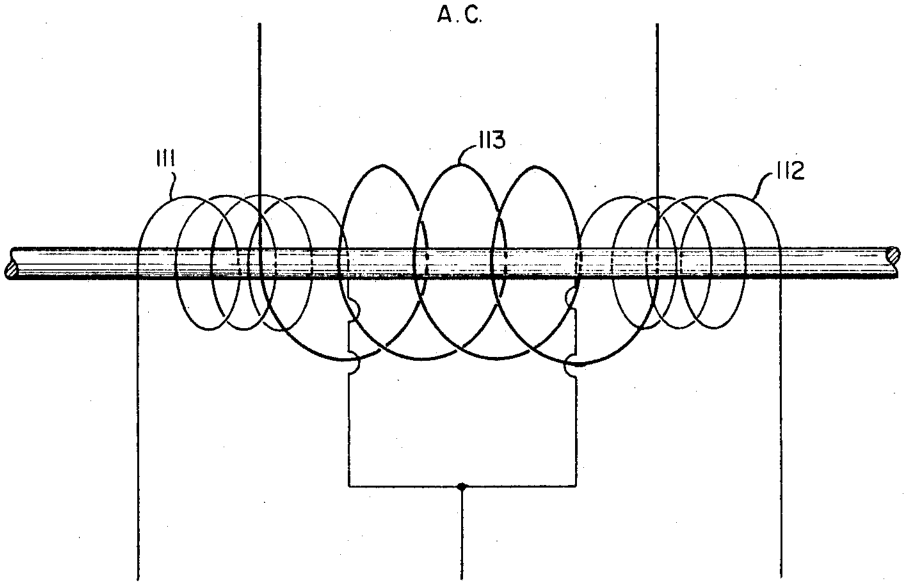

The plural pick-up elements may be separated by greater or lesser distances without exceeding the scope of the present invention. In the accompanying FIG. 9, for example, pick-up coils 111 and 112, respectively, overlap adjacent ends of an outer exciting winding 113 but still an arrangement is presented whereby the two pick-up means are located one on one side of and the other on the other side of an imaginary transverse to axis plane passing centrally through coaxial excitation means. While the drawings are schematic and do not show detailed structure it is preferred to have at least the pick-up means, if coils, wound on substantially non-magnetic material bobbins and with no close magnetic material co-extensive with them axially. Otherwise an unworkable arrangement can result because of too great a sensitivity to unavoidable radial motions of sample. Furthermore, if the sample is ferrous, and particularly with D.C. excitation, it is well to avoid magnetic material in the pick-ups (and/or in the excitation means) to avoid magnetic "pulling" of sample to one side with concomitant greatly disproportionate responses depending on circumferential location of sought-for flaws.

It will be observed (see FIG. 1 or 6) that the leads from the sensing elements go to individual active electronic control elements (which may be triodes such as the half tubes shown, or transistors, if that is desired). Since the object is to provide constant loading on the sensing coils (or capacitive electrodes, or whatever), the leads from sensing means to these high impedance devices go from one to the other "substantially immediately" or "directly," by which I mean that no load changing device intervenes between either sensing means and its respecttive electronic control element, and those in the art will understand that a tapped voltage divider, if properly connected, is not a load changing device. As a matter of fact such voltage dividers could be either before or after the first stage. If before (as in FIG. 6) it almost has to be a potentiometer, but if after the first stage an ordinary variable resistor might be used to perform a similar function, of varying sensitivity of the one side of the circuit without disturbing desired phase relation, depending on where it was placed in the circuitry. The word "triode" is meant to include devices having three or more parts, pentodes, etc.

While I have illustrated and described particular embodiments, more than two pick-up elements might be used and many other modifications may be made without departing from the true spirit and scope of the invention which is intended to be defined only by the accompanying claims taken with all reasonable equivalents.

I claim:

1. Apparatus for detecting a flaw in a relatively moving sample having relatively extended length and a longitudinal axis which coincides with the direction of relative movement, comprising the combination of:

a field generating device having two ends and arranged coaxial with the sample without magnetic material intervening between said field generating device and sample, a first sensing coil arranged coaxial with the sample without magnetic material intervening between said sensing coil and sample, said sensing coil being located adjacent one of said field generating device ends, a second sensing coil arranged coaxial with the sample without magnetic material intervening between said second sensing coil and sample, said second sensing coil being located adjacent the other of said field generating device ends, a first voltage divider having two ends and a tap with the ends thereof connected to be energized by the first sensing coil, a second voltage divider having two ends and a tap with the ends thereof connected to be energized by the second sensing coil, first and second controllable electronic devices each having a load circuit and a control circuit and wherein each control circuit has an impedance which is high compared to that of each of said first and second voltage dividers, connections connecting the tap and one end of the first voltage divider with the control circuit of the first electronic device and connecting the tap and one end of the second voltage divider with the control circuit of the second electronic device, voltage supply means, load resistors, and connections from said voltage source through said load resistors respectively to the load circuits of each of said first and second electronic devices, to derive useful outputs therefrom.

2. Apparatus as in claim 1 further characterized by [the FIG. 6 arrangement]:

third and fourth controllable electronic devices each having a load circuit and a control circuit, connections connecting the load circuits of the first and second electronic devices respectively with the control circuits of the third and fourth electronic devices, two half-wave voltage doublers respectively coupled to the load circuits of the third and fourth electronic devices, said half-wave voltage doublers being of opposite polarity and sharing common connections and respectively having load resistors sharing a common connection, whereby the combination provides difference detection.

3. Apparatus as in claim 1 further characterized by a difference detector connected to receive two signals responsive to the respective outputs of said first and second electronic devices and to produce a single-ended output.

4. Apparatus as in claim 1 further characterized by the said first and second electronic devices being connected together [as in 16 per se, in FIG. 1] and thus acting as a differential amplifier wherein common signal discrimination is provided and a single-ended output is produced.

5. In apparatus for detecting a flaw in a relatively moving sample having relatively extended length and a longitudinal axis which coincides with the direction of relative movement, a source of alternating current power, a field generating means comprising a coil connected to said source of power and arranged coaxial with the sample, two sensing means which are a pair of coils coaxial with the sample while separated from one another along the sample longitudinal axis and thus along the line of relative movement of sample with respect to apparatus, said field generating means and said sensing means surrounding said sample without magnetic material intervening between field generating means and sample and without magnetic material intervening between sensing means and sample, circuitry including two individual active electronic control elements respectively connected to confront the respective sensing means through connections which electrically couple the sensing means respectively with said individual control elements whereby to provide constant loading of said sensing means, and a pair of voltage dividers each having a movable tap and with the voltage dividers respectively connected each across a different one of the respective sensing coils while the voltage divider taps serve as part of the connections which couple the sensing means respectively with the individual electronic control elements.

References Cited by the Examiner

FOREIGN PATENTS 881,643 4/1943 France.

WALTER L. CARLSON, *Primary Examiner.*

R. J. CORCORAN, *Assistant Examiner.*